United States Patent Office 2,730,524
Patented Jan. 10, 1956

2,730,524
PROCESS FOR THE OXIDATION OF CELLULOSE

Karel Johannes Nieuwenhuis, Delft, Netherlands, assignor to Nederlandse Organisatie voor Toegepast-Natuurwetenschappelijk Onderzoek ten behoeve van Nijverheid, Handel en Verkeer, The Hague, Netherlands, a corporation of Netherlands No Drawing. Application October 25, 1951,
Serial No. 253,198

Claims priority, application Netherlands October 28, 1950

14 Claims. (Cl. 260—212)

The present invention relates to a process for the oxidation of celluloses and cellulose-containing substances to macro-molecular products by means of nitric acid. The products thus produced are useful for soaking, washing or cleaning, and to a process for the exchanging of cations, as well as the use as a so-called filter aid, and to their use as medicinal absorbable materials.

It is known to oxidize celluloses and cellulose-containing material to macromolecular products with a high content of carboxyl groups by means of or with the help of nitric acid, this nitric acid being in a gaseous or liquid state. Besides the desired oxidation, unwanted secondary reactions may occur to a considerable extent during the process.

In the U. S. Patent No. 2,232,990, a process is described for the preparation of an oxidized cellulose, according to which process cellulose is treated with gaseous $NO_2$ without any further addition, except possibly for air which is not being excluded, at a temperature not higher than about 20° C. By this process at least 0.6 part of $NO_2$ is used for each part of cellulose.

In U. S. Patent No. 2,256,391, a process is described for the preparation of oxidized cellulose by treating cellulose with a mixture, mainly consisting of liquid $NO_2$ and 5–15% of nitric acid.

In U. S. Patent No. 2,448,892 the preparation is described of very pure oxidized cellulose with only a low content of $NO_2$ according which process the cellulose is simply treated with a solution of $NO_2$ or $N_2O_4$ in a halogenated hydrocarbon, at normal temperature.

If the reaction is carried out with nitric acid exclusively, in such a way that only a very small to moderate decomposition of the cellulose takes place, a higher content of 15 carboxyl groups per 100 monose units will never be obtained, unless the cellulose is previously swollen in a 85% solution of phosphoric acid.

It was known from J. Am. Chem. Soc. 71 (1949), 2200, that one could obtain celluloses with a higher content of carboxyl groups by the addition of sodium nitrite and nitric acid than by the addition of nitric acid alone. It is now common knowledge that oxidized celluloses or oxidized cellulose-containing substances are useful as soaking, washing and cleaning agents as well as for exchanging cations. Further it is known from Ind. Eng. Chem. 1949, volume 41, page 2 to use oxidized cellulose as a medicinal material viz. as a material for implantation in body tissues to prevent adhesion, the oxidized cellulose being absorbed by the blood.

According to the present invention macromolecular oxidized celluloses or macromolecular oxidized cellulose-containing substances are prepared by treating the cellulose or cellulose-containing material with nitric acid in the presence of substances not containing nitrite groups, but being able to produce a nitrogen-oxygen compound particularly of the group consisting of NO, $NO_2$ and $N_2O_4$, by reaction with the nitric acid. Such substances are indicated further in the description (e. g. in the tables) as reducing substances. Preferably nitric acid is used, having a specific gravity of about 1.4.

Among the substances, being able to produce NO, $NO_2$ and/or $N_2O_4$ from nitric acid, we mention: (meta)bisulfites, hydrosulfites, thiosulfates, sulfides, arsenous oxide, metallic tin, stannous salts, di-, tri- or poly-saccharides, such as saccharose, lactose and raffinose, or even common lighting gas. If the latter is used, it is sufficient to have the reaction proceed in a lightning-gas-medium. However, it is preferred to bubble the gas through the reaction mixture, whereby the mixture is constantly agitated.

It is possible to prepare the required small quantity of mono-, di-, tri- or polysaccharides to be used by hydrolysis of part of the cellulose, or by a partial hydrolysis of the polyose, e. g. by a treatment with rather diluted nitric acid or sulphuric acid.

To compare the process described in the above mentioned J. Am. Chem. Soc. article with the process of the present invention, the following experiments were carried out.

5 g. of cotton-wool were moistened with 14 cm.³ of nitric acid (density 1.4). Then 4 g. of sodium nitrite were added, after which the mass was homogenized as well as possible by shaking the Erlenmeyer flask, closed with a stopper immediately after addition of the nitrite. After standing for 96 hours at room temperature, washing with water and drying, 5 g. of oxycellulose were obtained having a content of 52 carboxyl groups per 100 monose units. Thus, in this experiment, the molecular ratio of cellulose (mol. weight of the monose-structure-unit=162): nitric acid:sodium nitrite amounted to 3:20:5.8. Thus per mol monose of the cellulose, the amount of mols $NO_2$ which theoretically could be formed according to the reaction

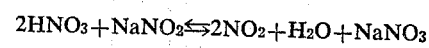
$$2HNO_3 + NaNO_2 \rightleftharpoons 2NO_2 + H_2O + NaNO_3$$

amounted to not less than 3.9.

It is evident that the degree of oxidation, which is obtained depends also on the quantity of nitric acid used. For example, starting from the same material and under similar conditions oxycelluloses were obtained having a content of 38, 43, 66 and 75 carboxyl groups per 100 monose units respectively if 10, 12, 18 or 20 cm.³ respectively of nitric acid were used.

According to the present invention, the nitrite is replaced by a smaller quantity of any reducing substance; thus oxycelluloses with high contents of carboxyl groups were obtained under equal conditions. This result is very surprising, for if any reducing substance containing no $NO_2$-groups, is used, no more $NO_2$ can ever be formed per mol $HNO_3$ than could be formed if a nitrite is used. For example, with a meta-bisulfite:

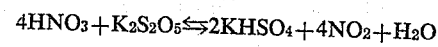
$$4HNO_3 + K_2S_2O_5 \rightleftharpoons 2KHSO_4 + 4NO_2 + H_2O$$

If 0.35–0.53 mol metabisulfite per mol monose of cellulose are used 1.4–2.1 mol of nitrogen peroxide at most can be formed per mol monose-structure-unit. But surprisingly, an oxycellulose is obtained containing not less than 62–65 carboxyl groups per 100 monose-units.

With 0.26, 0.18 and 0.09 mol metabisulfite per mol monose of cellulose, the oxidation coefficient amounted to 0.59, 0.58 and 0.39 respectively. Even when 0.18 mol metabisulfite are used by which at most 0.72 mol nitrogen dioxide per mol monose-structure-unit can be formed, a higher oxidation degree is obtained than with the use of 1.95 mol nitrite per mol monose of cellulose, by which not less than 3.9 mol $NO_2$ per mol monose-structure-unit is obtained.

If desired, oxygen or an oxygen containing gas such as air, may be supplied during the reaction to convert nitrogen oxide which has been formed during the reaction, into nitrogen dioxide (nitrogen tetraoxide); or, in general, to convert lower nitrogen oxides into higher nitrogen oxides.

In following table the results obtained are summarized:

| Raw mat. | | HNO₃ S. G. 1.4 | Reduc. subst. | | Oxyd. degree | Product, g. | Molecular ratio | | |
|---|---|---|---|---|---|---|---|---|---|
| Kind | Quant., g. | | Kind | Quant., g. | | | Monose | HNO₃ | Reduc. subst. |
| Cott. Wool | 5 | 14 ml. | NaNO₂ | 4 | 0.52 | 5.00 | 3 | 20 | 5.8 |
| Cott. Wool | 5 | 14 ml. | Na₂S₂O₅ | 3 | 0.52 | 4.80 | 3 | 20 | 1.6 |
| Cott. Wool | 5 | 14 ml. | Na₂S₂O₄ | 3 | 0.58 | 4.87 | 3 | 20 | 1.7 |
| Cott. Wool | 10 | 40 ml. | Light. gas | | 0.43 | | 6 | 57 | |
| Cott. Wool | 5 | 14 ml. | Sn | 6 | 0.33 | 4.51 | 3 | 20 | 5 |
| Cott. Wool | 5 | 14 ml. | (COOH)₂ | 7 | 0.37 | 4.00 | 3 | 20 | 5.6 |
| Cott. Wool | 5 | 14 ml. | saccharose | 3 | 0.46 | 5.00 | 3 | 20 | 0.9 |
| Cott. Wool | 5 | 14 ml. | glucose | 1.1 | 0.66 | 5.00 | 3 | 20 | 0.7 |

The result of an experiment with 5 g. of cotton wool with nitric acid alone (14 ml.) having a specific gravity of 1.4, consequently without further additions, was 4.65 g. of an oxidation product having a content of only 8 of carboxyl groups per 100 monose units.

All experiments were carried out at room temperature; the duration of the reaction amounted to about 100 hours. At the end of the reaction, the obtained samples were washed with distilled water and analyzed according to the well known volumetric calcium acetate and sodium hydroxide method.

With raw cellulose-containing material the following tests were carried out:

| Raw mat. | | HNO₃ S. G. 1.4 | Reduc. subst. | | Amount mg. eq. Acid groups per g. of dry subst. | Product, g. | Molecular ratio | |
|---|---|---|---|---|---|---|---|---|
| Kind | Quant., g. | | Kind | Quant., g. | | | HNO₃ | Reduc. subst. |
| Wood dust (ground) | 5 | 24 ml. | NaNO₂ | 4 | 4.60 | 2 | | |
| Do | 5 | 6 ml. | NaNO₂ | 4 | 1.88 | | | |
| Do | 5 | 14 ml. | Na₂S₂O₅ | 3 | 3.88 | 2.5 | 20 | 1.6 |
| Do | 5 | 14 ml. | Na₂S₂O₄ | 3 | 3.17 | 2.5 | 20 | 1.7 |
| Do | 5 | 14 ml. | Light. gas | | 3.07 | 2.5 | | |

The following are examples of the use of a cellulose hydrolysate as reducing substance:

Example I 5 g. of flax scutches are heated with 10 ml. of nitric acid (density 1.4) at 100° C. for a quarter of an hour. Thereupon the reaction mass is cooled and kept at room temperature for 120 hours. After washing etc. 1.5 g. of a yellow fibrous mass, containing 2.1 mg. eq. acid (cation exchanging) groups per g. of dry substance is obtained.

Example II 0.5 g. ground wood dust are boiled with 14 ml. of nitric acid, density 1.4. After cooling, 4.5 g. ground wood dust are added. Thereupon the mixture is homogenized and kept at room temperature for 92 hours. After washing etc., 1.5 g. of a yellow powdery, fine fibrous material, containing 3.85 mg. eq. acid (cation exchanging) groups per g. of dry substance is obtained.

It may be observed that the above examples do not represent the optimal conditions for the use of hydrolysate of the two mentioned raw materials.

What is claimed as new and desired to be secured by Letters Patent is:

1. A process of oxidizing cellulose, comprising the steps of treating a cellulose-containing material with nitric acid in the presence of a reducing agent adapted to react with said nitric acid to produce a nitrogen oxide and being free of nitrite groups, thereby causing oxidation of the cellulose by the formed nitrogen oxide; and recovering a macromolecular oxidized cellulose having a high number of carboxyl groups per monose unit.

2. A process of oxidizing cellulose, comprising the steps of treating a cellulose-containing material with nitric acid in the presence of a reducing agent selected from the group consisting of meta bisulfites, hydrosulfites, thiosulfates, sulfides, arsenous oxide, tin, stannous salts, polysaccharides and lighting gas adapted to react with said nitric acid to produce a nitrogen oxide and being free of nitrite groups, thereby causing oxidation of the cellulose by the formed nitrogen oxide; and recovering a macromolecular oxidized cellulose having a high number of carboxyl groups per monose unit.

3. A process of oxidizing cellulose, comprising the steps of treating a cellulose-containing material with nitric acid in the presence of a reducing agent adapted to react with said nitric acid to produce a nitrogen oxide selected from the group consisting of NO, NO₂ and N₂O₄ and being free of nitrite groups, thereby causing oxidation of the cellulose by the formed nitrogen oxide; and recovering a macromolecular oxidized cellulose having a high number of carboxyl groups per monose unit.

4. A process of oxidizing cellulose, comprising the steps of treating a cellulose-containing material with nitric acid in the presence of a sulfite as reducing agent adapted to react with said nitric acid to produce a nitrogen oxide, thereby causing oxidation of the cellulose by the formed nitrogen oxide; and recovering a macromolecular oxidized cellulose having a high number of carboxyl groups per monose unit.

5. A process of oxidizing cellulose, comprising the steps of treating a cellulose-containing material with nitric acid in the presence of a thiosulfate as reducing agent adapted to react with said nitric acid to produce a nitrogen oxide, thereby causing oxidation of the cellulose by the formed nitrogen oxide; and recovering a macromolecular oxidized cellulose having a high number of carboxyl groups per monose unit.

6. A process of oxidizing cellulose, comprising the steps of treating a cellulose-containing material with nitric acid in the presence of a sulfide as reducing agent adapted to react with said nitric acid to produce a nitrogen oxide, thereby causing oxidation of the cellulose by the formed nitrogen oxide; and recovering a macromolecular oxidized cellulose having a high number of carboxyl groups per monose unit.

7. A process of oxidizing cellulose, comprising the steps of treating a cellulose-containing material with nitric acid in the presence of a polysaccharide as reducing agent adapted to react with said nitric acid to produce a nitrogen oxide, thereby causing oxidation of the cellulose by the formed nitrogen oxide; and recovering a macromolecular oxidized cellulose having a high number of carboxyl groups per monose unit.

8. A process of oxidizing cellulose, comprising the steps of treating a cellulose-containing material with nitric acid in the presence of lighting gas as reducing agent adapted to react with said nitric acid to produce a nitrogen oxide, thereby causing oxidation of the cellulose by the formed nitrogen oxide; and recovering a macromolecular oxidized cellulose having a high number of carboxyl groups per monose unit.

9. A process of oxidizing cellulose, comprising the steps of treating a cellulose-containing material with nitric acid in the presence of a gaseous reducing agent adapted to react with said nitric acid to produce a nitrogen oxide and being free of nitrite groups, thereby causing oxidation of the cellulose by the formed nitrogen oxide; and recovering a macromolecular oxidized cellulose having a high number of carboxyl groups per monose unit.

10. A process according to claim 9 in which said gaseous reducing agent is bubbled through the reaction mixture comprising cellulose-containing material and nitric acid.

11. A process of oxidizing cellulose, comprising the steps of treating cellulose with nitric acid in the presence of a reducing agent adapted to react with said nitric acid to produce a nitrogen oxide and being free of nitrite groups, thereby causing oxidation of said cellulose by the formed nitrogen oxide; and recovering a macromolecular oxidized cellulose having a high number of carboxyl groups per monose unit.

12. A process of oxidizing cellulose, comprising the steps of at least partially hydrolyzing a raw cellulose-containing material so as to form a polysaccharide; treating additional cellulose-containing material with nitric acid in the presence of said formed polysaccharide as reducing agent adapted to react with said nitric acid to produce a nitrogen oxide, thereby causing oxidation of the cellulose by the formed nitrogen oxide; and recovering a macromolecular oxidized cellulose having a high number of carboxyl groups per monose unit.

13. A process of oxidizing cellulose, comprising the steps of treating a cellulose-containing material with nitric acid in the presence of a reducing agent adapted to react with said nitric acid to produce a nitrogen oxide and being free of nitrite groups and in the presence of a gas containing free oxygen so as to convert the formed lower nitrogen oxides to higher nitrogen oxides, thereby causing oxidation of the cellulose by the formed nitrogen oxides; and recovering a macromolecular oxidized cellulose having a high number of carboxyl groups per monose unit.

14. A process of oxidizing cellulose, comprising the steps of hydrolyzing part of a quantity of a cellulose-containing material so as to form lower polysaccharides from said part; treating the remaining non-hydrolyzed cellulose-containing material with nitric acid in the presence of said formed polysaccharides as reducing agent adapted to react with said nitric acid to produce a nitrogen oxide, thereby causing oxidation of the cellulose by the formed nitrogen oxide; and recovering a macromolecular oxidized cellulose having a high number of carboxyl groups per monose unit.

References Cited in the file of this patent

UNITED STATES PATENTS

| | | |
|---|---|---|
| 2,232,990 | Yackel et al. | Feb. 25, 1941 |
| 2,256,391 | Hiatt | Sept. 16, 1941 |
| 2,344,411 | Reeves | Mar. 14, 1944 |
| 2,474,306 | Doub | June 28, 1949 |
| 2,482,042 | Van Delden | Sept. 13, 1949 |
| 2,537,978 | Eberl | Jan. 16, 1951 |